(12) United States Patent
Bookbinder et al.

(10) Patent No.: US 10,302,857 B2
(45) Date of Patent: May 28, 2019

(54) LOW BEND LOSS OPTICAL FIBER WITH A GERMANIA DOPED CORE

(71) Applicant: Corning Incorporated, Corning, NY (US)

(72) Inventors: Dana Craig Bookbinder, Corning, NY (US); Ming-Jun Li, Horseheads, NY (US); Snigdharaj Kumar Mishra, Wilmington, NC (US); Pushkar Tandon, Painted Post, NY (US)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 15/957,414

(22) Filed: Apr. 19, 2018

(65) Prior Publication Data

US 2018/0321438 A1 Nov. 8, 2018

Related U.S. Application Data

(60) Provisional application No. 62/500,563, filed on May 3, 2017.

(51) Int. Cl.
*G02B 6/02* (2006.01)
*G02B 6/036* (2006.01)
*G02B 6/028* (2006.01)

(52) U.S. Cl.
CPC ....... *G02B 6/02219* (2013.01); *G02B 6/0286* (2013.01); *G02B 6/03633* (2013.01);
(Continued)

(58) Field of Classification Search
CPC ............ G02B 6/02014; G02B 6/02242; G02B 6/02395; G02B 6/0285; G02B 6/0286;
(Continued)

(56) References Cited

U.S. PATENT DOCUMENTS

| 5,410,567 A | 4/1995 | Brundage et al. |
| 6,027,062 A | 2/2000 | Bacon et al. |

(Continued)

FOREIGN PATENT DOCUMENTS

| EP | 1777559 A1 | 4/2007 |
| EP | 2211211 B1 | 10/2014 |

OTHER PUBLICATIONS

International Search Report and Written Opinion of the International Searching Authority; PCT/US2018/030170; dated Jul. 16, 2018; 11 pages; European Patent Office.

(Continued)

*Primary Examiner* — Michael P Mooney
(74) *Attorney, Agent, or Firm* — Robert L. Carlson

(57) ABSTRACT

A single mode optical fiber including a germania doped silica central core region having outer radius $r_1$ and refractive index $\Delta_1$, a maximum refractive index $\Delta_{1max}$, and $0.32\% \leq \Delta_{1max} \leq 0.45\%$, and a core alpha profile (Core$_\alpha$). In various embodiments, the optical fiber also contains a cladding region including: (i) a second inner cladding region or ring region surrounding the first inner cladding region; or (ii) an inner cladding region or pedestal region surrounding the germania doped silica central core region. The corresponding resultant optical fibers exhibit a 22 m cable cutoff less than or equal to 1260 nm, a macrobending loss at 1550 nm of ≤0.75 dB/turn on a 20 mm diameter mandrel, a zero dispersion wavelength, $\lambda_0$, of 1300 nm≤$\lambda_0$≤1324 nm, and a mode field diameter at 1310 nm of 8.2 microns≤$MDF_{1310\,nm}$≤9.6 microns.

20 Claims, 5 Drawing Sheets

(52) U.S. Cl.
CPC ........ *G02B 6/03644* (2013.01); *G02B 6/0281* (2013.01); *G02B 6/02266* (2013.01)

(58) Field of Classification Search
CPC ............ G02B 6/03611; G02B 6/03627; G02B 6/03633; G02B 6/03638; G02B 6/03644; G02B 6/0365; G02B 6/14; G02B 6/124
USPC ................................................ 385/123–128
See application file for complete search history.

(56) References Cited

U.S. PATENT DOCUMENTS

| | | |
|---|---|---|
| 7,565,820 B2 | 7/2009 | Foster et al. |
| 7,832,675 B2 | 11/2010 | Bumgarner et al. |
| 8,891,925 B2 | 11/2014 | Bickham et al. |
| 8,953,917 B2 | 2/2015 | Berkey et al. |
| 9,580,350 B2 | 2/2017 | Annamalai et al. |
| 9,618,692 B2 | 4/2017 | Berkey et al. |
| 2007/0077016 A1* | 4/2007 | Bickham ............ G02B 6/02242 385/128 |
| 2018/0031761 A1 | 2/2018 | Bookbinder et al. |

OTHER PUBLICATIONS

Single Mode Fiber Optics, Jeunhomme, pp. 39-44, Marcel Dekker, New York, 1990.

\* cited by examiner

LOW BEND LOSS OPTICAL FIBER WITH A GERMANIA DOPED CORE

This application claims the benefit of priority under 35 U.S.C. § 119 of U.S. Provisional Application Ser. No. 62/500,563 filed on May 3, 2017 the content of which is relied upon and incorporated herein by reference in its entirety.

TECHNICAL FIELD

The present disclosure generally relates to optical fibers having low bend losses, and in particular relates to optical fibers having germania doped cores and a cladding surrounding the core.

BACKGROUND

There is a need for low bend loss optical fibers, particularly for optical fibers utilized in so-called "access" and fiber to the premises (FTTx) optical networks. Optical fiber can be deployed in such networks in a manner which induces bend losses in optical signals transmitted through the optical fiber. Some applications that can impose physical demands, such as tight bend radii, compression of optical fiber, etc., that induce bend losses include the deployment of optical fiber in optical drop cable assemblies, distribution cables with Factory Installed Termination Systems (FITS) and slack loops, small bend radius multiports located in cabinets that connect feeder and distribution cables, and jumpers in Network Access Points between distribution and drop cables. It has been difficult in some optical fiber designs to simultaneously achieve low macrobending loss, low microbending loss, low cable cutoff wavelength, a zero dispersion wavelength between 1300 nm and 1324 nm, 1310 mode field diameter of 8.2 to 9.6 microns, and ITU G.652 standards compliant.

SUMMARY

According to one embodiment, an optical fiber is provided. The optical fiber includes a germania doped silica central core region having outer radius $r_1$ and 3.5 microns$\leq r_1 \leq$5.5 microns and refractive index $\Delta_1$, a maximum refractive index $\Delta_{1max}$, and 0.32%$\leq \Delta_{1max} \leq$0.45%, and a core alpha profile, Core$_\alpha$ where 1$\leq$Core$_\alpha \leq$100. The optical fiber also includes a cladding region including (i) a first inner cladding region surrounding the germania doped silica central core region having an outer radius $r_2$ and 4.5 microns$\leq r_2 \leq$7.5 microns and refractive index $\Delta_2$ and an $r_1/r_2$ ratio and 0.60$\leq r_1/r_2 \leq$0.90; (ii) and a second inner cladding region surrounding the first inner cladding region having an outer radius $r_3$ and 5.5 microns$\leq r_3 \leq$20.5 microns and having refractive index $\Delta_3$ and a maximum refractive index $\Delta_{3max}$ and 0.02%$\leq \Delta_{3max} \leq$0.15%; and (iii) an outer cladding region surrounding the second inner cladding region and having refractive index $\Delta_4$, wherein $\Delta_{1max} > \Delta_{3max} > \Delta_4 \geq \Delta_2$. The optical fiber exhibits a 22 m cable cutoff less than or equal to 1260 nm, a macrobending loss at 1550 nm of $\leq$0.75 dB/turn on a 20 mm diameter mandrel, has a zero dispersion wavelength, $\lambda_0$, and 1300 nm $\lambda_0$ 1324 nm, and the optical fiber exhibits a mode field diameter at 1310 nm of 8.2 microns$\leq$MFD$_{1310\ nm} \leq$9.6 microns.

According to another embodiment, a single mode optical fiber is provided. The single mode optical fiber includes a germania doped silica central core region having outer radius $r_1$ and 3.5 microns$\leq r_1 \leq$5.5 microns and refractive index $\Delta_1$, a maximum refractive index $\Delta_{1max}$, and 0.32%$\leq \Delta_{1max} \leq$0.45%, and a core alpha profile, Core$_\alpha$ where 1$\leq$Core$_\alpha \leq$100. The single mode optical fiber also includes a cladding region having (i) a first inner cladding region surrounding the germania doped silica central core region having an outer radius $r_2$ and 4.5 microns$\leq r_2 \leq$7.5 microns and refractive index $\Delta_2$ and an $r_1/r_2$ ratio and 0.60$\leq r_1/r_2 \leq$0.90; (ii) and a second inner cladding region surrounding the first inner cladding region having an outer radius $r_3$ and 5.5 microns$\leq r_3 \leq$20.5 microns and having refractive index $\Delta_3$, and a maximum refractive index $\Delta_{3max}$ and 0.02%$\leq \Delta_{3max} \leq$0.15%; and (iii) an outer cladding region surrounding the second inner cladding region and having refractive index $\Delta_4$, wherein $\Delta_{1max} > \Delta_{3max} > \Delta_4 \geq \Delta_2$. The single mode optical fiber exhibits a 22 m cable cutoff less than or equal to 1260 nm, a macrobending loss at 1550 nm of $\leq$0.75 dB/turn on a 20 mm diameter mandrel, has a zero dispersion wavelength, $\lambda_0$, of 1300 nm$\leq \lambda_0 \leq$1324 nm, and a mode field diameter at 1310 nm of $\leq$8.2 microns$\leq$ MFD$_{1310\ nm}$ 9.6 microns.

According to yet another embodiment, an optical fiber is provided. The optical fiber includes a germania doped silica central core having outer radius $r_1$ and 3.5 microns$\leq r_1 \leq$5.5 microns and refractive index $\Delta_1$, a maximum refractive index $\Delta_{1max}$, and 0.32%$\leq \Delta_{1max} \leq$0.45%, and a core alpha profile, Core$_\alpha$, where 1$\leq$Core$_\alpha \leq$100. The optical fiber also includes a cladding region including (i) an inner cladding region surrounding the germania doped silica central core region having an outer radius $r_2$ and 5.5 microns$\leq r_2 \leq$20.5 microns and refractive index $\Delta_2$ and a $r_1/r_2$ ratio and 0.25$\leq r_1/r_2 \leq$0.85; and (ii) an outer cladding region surrounding the inner cladding region and having refractive index $\Delta_4$, wherein $\Delta_{1max} > \Delta 2 > \Delta 4$, and 0.02%$\leq \Delta_2 - \Delta 4 \leq$0.15%. The optical fiber exhibits a 22 m cable cutoff less than or equal to 1260 nm, a macrobending loss at 1550 nm of $\leq$0.75 dB/turn on a 20 mm diameter mandrel, has a zero dispersion wavelength, $\lambda_0$, and 1300 nm$\leq \lambda_0 \leq$1324 nm, and the optical fiber exhibits a mode field diameter at 1310 nm of 8.2 microns$\leq$MFD$_{1310\ nm} \leq$9.6 microns.

According to another embodiment, a single mode optical fiber is provided. The single mode optical fiber includes a germania doped silica central core region having outer radius $r_1$ and 3.5 microns$\leq r_1 \leq$5.5 microns and refractive index $\Delta_1$, a maximum refractive index $\Delta_{1max}$, and 0.32%$\leq \Delta_{1max} \leq$0.45%, and a core alpha profile, Core$_\alpha$, where 1$\leq$Core$_\alpha \leq$100. The single mode optical fiber also includes a cladding region comprising (i) an inner cladding region surrounding the germania doped silica central core region having an outer radius $r_2$ and 5.5 microns$\leq r_2 \leq$20.5 microns and refractive index $\Delta_2$ and a $r_1/r_2$ ratio and 0.25$\leq r_1/r_2 \leq$0.85; and (ii) an outer cladding region surrounding the inner cladding region and comprising refractive index $\Delta_4$, wherein $\Delta_{1max} > \Delta 2 > \Delta 4$, and 0.02%$\leq \Delta_2 - \Delta 4 \leq$0.15%. The single mode optical fiber exhibits a 22 m cable cutoff less than or equal to 1260 nm, a macrobending loss at 1550 nm of $\leq$0.75 dB/turn on a 20 mm diameter mandrel, has a zero dispersion wavelength, $\lambda_0$, and 1300 nm$\leq \lambda_0 \leq$1324 nm, and a mode field diameter at 1310 nm of 8.2 microns$\leq$MFD$_{1310\ nm} \leq$9.6 microns.

Additional features and advantages will be set forth in the detailed description which follows, and in part will be readily apparent to those skilled in the art from that description or recognized by practicing the embodiments as described herein, including the detailed description which follows, the claims, as well as the appended drawings.

It is to be understood that both the foregoing general description and the following detailed description are merely exemplary, and are intended to provide an overview or framework to understanding the nature and character of the claims. The accompanying drawings are included to provide a further understanding, and are incorporated in and constitute a part of this specification. The drawings illustrate one or more embodiments, and together with the description serve to explain principles and operation of the various embodiments.

BRIEF DESCRIPTION OF THE DRAWINGS

The accompanying drawings are included to provide a further understanding, and are incorporated in and constitute a part of this specification. The drawings illustrate one or more embodiments, and together with the description serve to explain principles and operation of the various embodiments.

DETAILED DESCRIPTION

Figure 1:
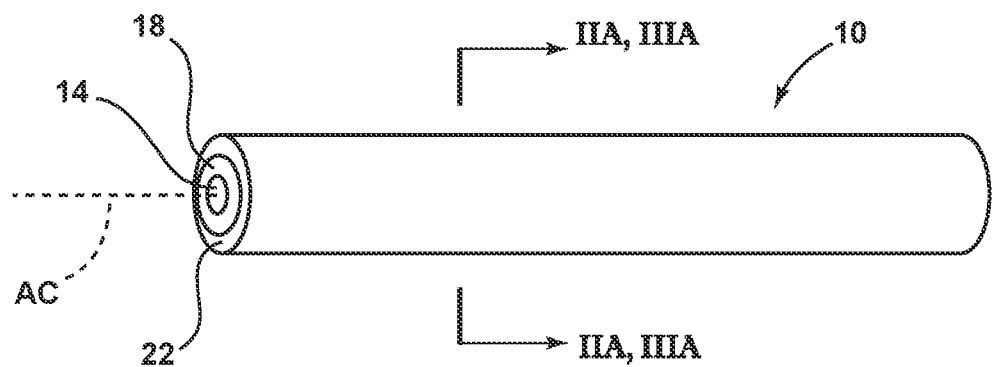
FIG. 1 is a side perspective view of an optical fiber according to one embodiment of the present disclosure.

Additional features and advantages will be set forth in the detailed description which follows and will be apparent to those skilled in the art from the description or recognized by practicing as described in the following description together with the claims and appended drawings.

Low attenuation is a critical property in optical fibers. Optical fibers disclosed herein are valuable for use as low attenuation optical fibers such as in optical fiber cables for submarine and terrestrial long haul systems.

The "refractive index profile" is the relationship between refractive index or relative refractive index (also referred to as refractive index delta herein) and waveguide fiber radius. The radius for each segment of the refractive index profile is given by the abbreviations $r_1$, $r_2$, $r_3$, $r_4$, etc. and lower and upper case are used interchangeability herein (e.g., $r_1$ is equivalent to $R_1$).

Unless stated otherwise, the "relative refractive index percent" is defined as $\Delta\% = 100 \times (n_i^2 - n_c^2)/2n_i^2$, and as used herein $n_c$ is the average refractive index of undoped silica glass. As used herein, the relative refractive index is represented by Δ and its values are given in units of "%", unless otherwise specified. The terms: relative refractive index percent, relative refractive index, refractive index delta, refractive index, relative refractive index delta, delta, Δ, Δ%, %Δ, delta %, % delta and percent delta may be used interchangeably herein. In cases where the refractive index of a region is less than the average refractive index of undoped silica, the relative index percent is negative and is referred to as having a depressed region or depressed index. In cases where the refractive index of a region is greater than the average refractive index of the cladding region, the relative index percent is positive. An "updopant" is herein considered to be a dopant which has a propensity to raise the refractive index relative to pure undoped $SiO_2$. A "downdopant" is herein considered to be a dopant which has a propensity to lower the refractive index relative to pure undoped $SiO_2$. Examples of updopants include $GeO_2$ (germania), $Al_2O_3$, $P_2O_5$, $TiO_2$, Cl, and/or Br. Examples of downdopants include fluorine and $B_2O_3$. As described herein, while the relative refractive index of the optical profiles are calculated where index of $n_c$ is undoped silica, the entire index profile of the optical fiber can be shifted linearly up (or down) in order to obtain equivalent optical fiber properties.

"Chromatic dispersion", herein referred to as "dispersion" unless otherwise noted, of a waveguide fiber is the sum of the material dispersion, the waveguide dispersion, and the inter-modal dispersion. In the case of single mode waveguide fibers, the inter-modal dispersion is zero. Zero dispersion wavelength is a wavelength at which the dispersion has a value of zero. Dispersion slope is the rate of change of dispersion with respect to wavelength.

"Effective area" is defined in equation 1 as:

$$A_{eff} = 2\pi(\int f^2 r dr)^2/(\int f^4 r dr) \qquad \text{Eq. 1}$$

where the integration limits are 0 to ∞, and f is the transverse component of the electric field associated with light propagated in the waveguide. As used herein, "effective area" or "$A_{eff}$" refers to optical effective area at a wavelength of 1550 nm unless otherwise noted.

The term "α-core profile", refers to a relative refractive index profile of the core, expressed in terms of Δ(r) which is in units of "%", where r is radius, which follows the equation (Eq. 2), $$\Delta(r) = \Delta(r_o)(1 - [|r - r_o|/(r_1 - r_o)]^{\alpha_{core}}) \qquad \text{Eq. 2}$$

where $r_o$ is the point at which Δ(r) is maximum and is the initial point of the α-core profile, $r_1$ is the outer radius of the core and corresponds to the final point of the core's α-profile, it is defined as where a tangent line drawn through maximum slope of the refractive index of core crosses the zero delta line (i.e., the point at which Δ(r) % is zero), and r is in the range $r_0 < r < r_1$, where Δ is defined above, $r_o$ corresponds to the initial point of the core's α-profile, $r_1$ corresponds to the final point of the α-profile, and $\alpha_{core}$ (also referred to herein as "core alpha") is an exponent which is a real number. In the discussion below, example values of $\alpha_{core}$ are provided for at least some of the embodiments described herein.

The term "α-profile of the inner cladding", also referred herein as the $alpha_{trench}$ or $\alpha_T$, refers to a relative refractive index profile of the inner cladding region, expressed in terms of Δ(r) which is in units of "%", where r is radius, which follows the equation (Eq. 3), $$\Delta(r) = \Delta(r_2) + (\Delta(r_1) - \Delta(r_2))(1 - [|r - r_1|/(r_2 - r_1)]^{\alpha_T}) \qquad \text{Eq. 3}$$

where $r_1$ is defined as above, and is typically the point at which Δ(r) of the inner cladding region is maximum, $r_2$ is the outer radius of the inner cladding and corresponds to a point at which a (vertical) line drawn through refractive index profile of inner cladding associated with its minimum refractive index crosses the zero delta line (i.e., the point at which Δ(r) % is zero), and r is in the range $r_i \leq r \leq r_f$, where Δ is defined above, $r_i$ is the initial point of the α-profile of the inner cladding region, $r_f$ is the final point of the α-profile of the inner cladding region, and $\alpha_T$ is an exponent which is a real number (also referred to as an inner cladding alpha herein).

The term "ring" as used herein, refers to a cladding region that has a variable refractive index with a maximum refractive index at $\Delta_{3max}$ that is higher than that of the adjacent cladding regions that are in contact therewith. The ring volume $V_{ring}$ is defined herein in equation 4 as:

$$V_{ring} \equiv 2 \int_{r_2}^{r_3} \Delta_{4-3}(r) r \, dr \qquad \text{Eq. 4}$$

wherein $\Delta_{4-3}(r)$ is $\Delta_4 - \Delta_3(r)$ for a given radial position r situated between the radial positions of $r_2$ and $r_3$, and wherein $r_2$ is the radial position where the refractive index in the ring cladding region, moving radially outward from centerline, is first equal to the refractive index of the outer cladding region. Ring volumes are reported in absolute value in units of % delta·microns². In some embodiments, the ring volumes are 0.4% delta·microns²≤$V_{ring}$≤15% delta·microns². In other embodiments, the ring volumes are 0.8% delta·microns²≤$V_{ring}$≤5% delta·microns².

The term "pedestal" as used herein, refers to a cladding region that has a refractive index $\Delta_2$ that is higher than that of the refractive index $\Delta_4$ cladding region that is in contact therewith. The pedestal volume $V_{pedestal}$ is defined herein in equation 5 as:

$$V_{pedestal} \equiv 2 \int_{r_1}^{r_2} \Delta_{4-2}(r) r \, dr \qquad \text{Eq. 5}$$

wherein $\Delta_{4-2}(r)$ is $\Delta_4 - \Delta_2(r)$ for a given radial position r situated between the radial positions of $r_1$ and $r_2$, and wherein $r_2$ is the radial position where the refractive index in the ring cladding region, moving radially outward from centerline, is first equal to the refractive index of the outer cladding region. Pedestal volumes are reported in absolute value in units of % delta·microns². In some embodiments, the pedestal volumes are 1% delta·microns²≤$V_{pedestal}$≤15% delta·microns². In other embodiments, the pedestal volumes are 2% delta·microns²≤$V_{pedestal}$≤6% delta·microns².

The mode field diameter (MFD) is measured using the Peterman II method wherein, 2w=MFD, and $w^2 = (2 \int f^2 r \, dr / \int [df/dr]^2 r \, dr)$, the integral limits being 0 to ∞.

The term "μm" and "microns" can be used interchangeably herein.

The bend resistance of a waveguide fiber can be gauged by induced attenuation under prescribed test conditions, for example by deploying or wrapping the fiber around a mandrel of a prescribed diameter, e.g., by wrapping 1 turn around a either a 6 mm, 10 mm, or 20 mm or similar diameter mandrel (e.g. "1×10 mm diameter macrobend loss" or the "1×20 mm diameter macrobend loss") and measuring the increase in attenuation per turn.

One type of bend test is the lateral load microbend test. In this so-called "lateral load" test (LLWM), a prescribed length of waveguide fiber is placed between two flat plates. A #70 wire mesh is attached to one of the plates. A known length of waveguide fiber is sandwiched between the plates and a reference attenuation is measured while the plates are pressed together with a force of 30 Newtons. A 70 Newton force is then applied to the plates and the increase in attenuation in dB/m is measured. The increase in attenuation is the lateral load attenuation of the waveguide in dB/m at a specified wavelength (typically within the range of 1200 nm-1700 nm, e.g., 1310 nm or 1550 nm or 1625 nm).

Another type of bend test is the wire mesh covered drum microbend loss test (WMCD). In this test, a 400 mm diameter aluminum drum is wrapped with wire mesh. The mesh is wrapped tightly without stretching, and should have no holes, dips, or damage. Wire mesh material specification: McMaster-Carr Supply Company (Cleveland, Ohio), part number 85385T106, corrosion-resistant type 304 stainless steel woven wire cloth, mesh per linear inch: 165×165, wire diameter: 0.0019", width opening: 0.0041", open area %: 44.0. A prescribed length (750 meters) of waveguide fiber is wound at 1 m/s on the wire mesh drum at 0.050 centimeter take-up pitch while applying 80 (+/−1) grams tension. The ends of the prescribed length of fiber are taped to maintain tension and there are no fiber crossovers. The attenuation of the optical fiber is measured at a specified wavelength (typically within the range of 1200-1700 nm, e.g., 1310 nm or 1550 nm or 1625 nm); a reference attenuation is measured on the optical fiber wound on a smooth drum. The increase in attenuation is the wire mesh covered drum attenuation of the waveguide in dB/km at a specified wavelength (typically within the range of 1200-1700 nm, e.g., 1310 nm or 1550 nm or 1625 nm).

The "pin array" bend test is used to compare relative resistance of waveguide fiber to bending. To perform this test, attenuation loss is measured for a waveguide fiber with essentially no induced bending loss. The waveguide fiber is then woven about the pin array and attenuation again measured. The loss induced by bending is the difference between the two measured attenuations. The pin array is a set of ten cylindrical pins arranged in a single row and held in a fixed vertical position on a flat surface. The pin spacing is 5 mm, center to center. The pin diameter is 0.67 mm. During testing, sufficient tension is applied to make the waveguide fiber conform to a portion of the pin surface. The increase in attenuation is the pin array attenuation in dB of the waveguide at a specified wavelength (typically within the range of 1200-1700 nm, e.g., 1310 nm or 1550 nm or 1625 nm).

The theoretical fiber cutoff wavelength, or "theoretical fiber cutoff", or "theoretical cutoff", for a given mode, is the wavelength above which guided light cannot propagate in that mode. A mathematical definition can be found in Single Mode Fiber Optics, Jeunhomme, pp. 39-44, Marcel Dekker, New York, 1990 wherein the theoretical fiber cutoff is described as the wavelength at which the mode propagation constant becomes equal to the plane wave propagation constant in the outer cladding. This theoretical wavelength is appropriate for an infinitely long, perfectly straight fiber that has no diameter variations.

Fiber cutoff is measured by the standard 2 m fiber cutoff test, FOTP-80 (EIA-TIA-455-80), to yield the "fiber cutoff wavelength", also known as the "2 m fiber cutoff" or "measured cutoff". The FOTP-80 standard test is performed to either strip out the higher order modes using a controlled amount of bending, or to normalize the spectral response of the fiber to that of a multimode fiber.

By cabled cutoff wavelength, or "cabled cutoff" as used herein, we mean the 22 m cabled cutoff test described in the EIA-445 Fiber Optic Test Procedures, which are part of the EIA-TIA Fiber Optics Standards, that is, the Electronics Industry Alliance-Telecommunications Industry Association Fiber Optics Standards.

The ratio of MFD at 1310 nm to Cable Cutoff wavelength (MFD at 1310 nm/Cable Cutoff wavelength in microns) is defined herein as MACC.

Unless otherwise noted herein, optical properties (such as dispersion, dispersion slope, etc.) are reported for the LP01 mode.

Referring now to FIG. 1, a side view of a single mode optical fiber 10 is provided. The optical fiber 10 has a centerline AC and a radial coordinate r. The optical fiber 10 has a germania doped silica central core 14 of radius $r_1$ surrounded by a cladding 18 having a maximum radius $r_{max}$. In some embodiments, the optical fiber 10 includes an undoped silica layer 22 that surrounds the cladding 18.

The core 14 has a core alpha profile (Core$_\alpha$) where 1≤Core$_\alpha$≤100 and a maximum relative refractive index delta $\Delta_{1max}$, where some embodiments are in the range 0.32%≤$\Delta_{1max}$≤0.45%, 0.34%≤$\Delta_{1max}$≤0.45%, 0.32%≤$\Delta_{1max}$≤0.40%, 0.32%≤$\Delta_{1max}$≤0.39%, or 0.34%≤$\Delta_{1max}$≤0.39%. In some embodiments, the core 14 has a radius $r_1$ in the range 3.5 microns≤$r_1$≤5.5 microns.

The core 14 can be made from silica doped with germania (Ge) at a Ge concentration≥3.0 wt %. In some embodiments, the Ge concentration may be ≥3.5 wt %, ≥4.0 wt %, or ≥4.5 wt %. The single mode optical fiber 10 can include the germania doped silica central core 14 region where the core alpha profile (Core$_\alpha$) is 1≤Core$_\alpha$≤100, 1≤Core$_\alpha$≤10, or 10≤Core$_\alpha$≤30.

In some embodiments, the optical fiber 10 may have a mode field diameter (MFD) at 1310 nm of ≤9 microns and in other embodiments can be in the range of 9 microns-≤MFD≤9.5 microns. In some embodiments, the optical fiber 10 exhibits a mode field diameter at 1310 nm of 8.2 microns≤MFD$_{1310\,nm}$≤9.6≤microns.

In some embodiments, the optical fiber 10 may have a 22 m cable cutoff less than or equal to 1260 nm, a macrobending loss at 1550 nm of ≤0.75 dB/turn on a 20 mm diameter mandrel, exhibits a MACC number between 6.6 and 8.3, and a zero dispersion wavelength, $\lambda_0$ ranging 1300 nm≤$\lambda_0$≤1324 nm. In other embodiments, the optical fiber 10 may have a 22 m cable cutoff less than or equal to 1260 nm, a macrobending loss at 1550 nm of ≤0.70 dB/turn on a 20 mm diameter mandrel, exhibits a MACC number between 7.1 and 8.1, a zero dispersion wavelength, $\lambda_0$ ranging 1300 nm≤$\lambda_0$≤1324 nm, and the optical fiber 10 exhibits a mode field diameter at 1310 nm of 8.2 microns≤MFD$_{1310\,nm}$≤9.6 microns.

In some embodiments, the optical fiber has a macrobending loss at 1550 nm of ≤0.5 dB/turn on a 20 mm diameter mandrel. In other embodiments, the optical fiber 10 has a macrobending loss at 1550 nm of ≤0.05 dB/turn on a 30 mm diameter mandrel. In still other embodiments, the optical fiber 10 has a macrobending loss at 1550 nm of >0 and ≤0.005 dB/turn on a 30 mm diameter mandrel.

The optical fiber 10 may have an outer radius for cladding 18 of $r_{max}$=62.5 microns.

The optical fiber 10 has a number of additional features as set forth in the embodiments discussed below.

Ring Embodiments

Figure 2A:
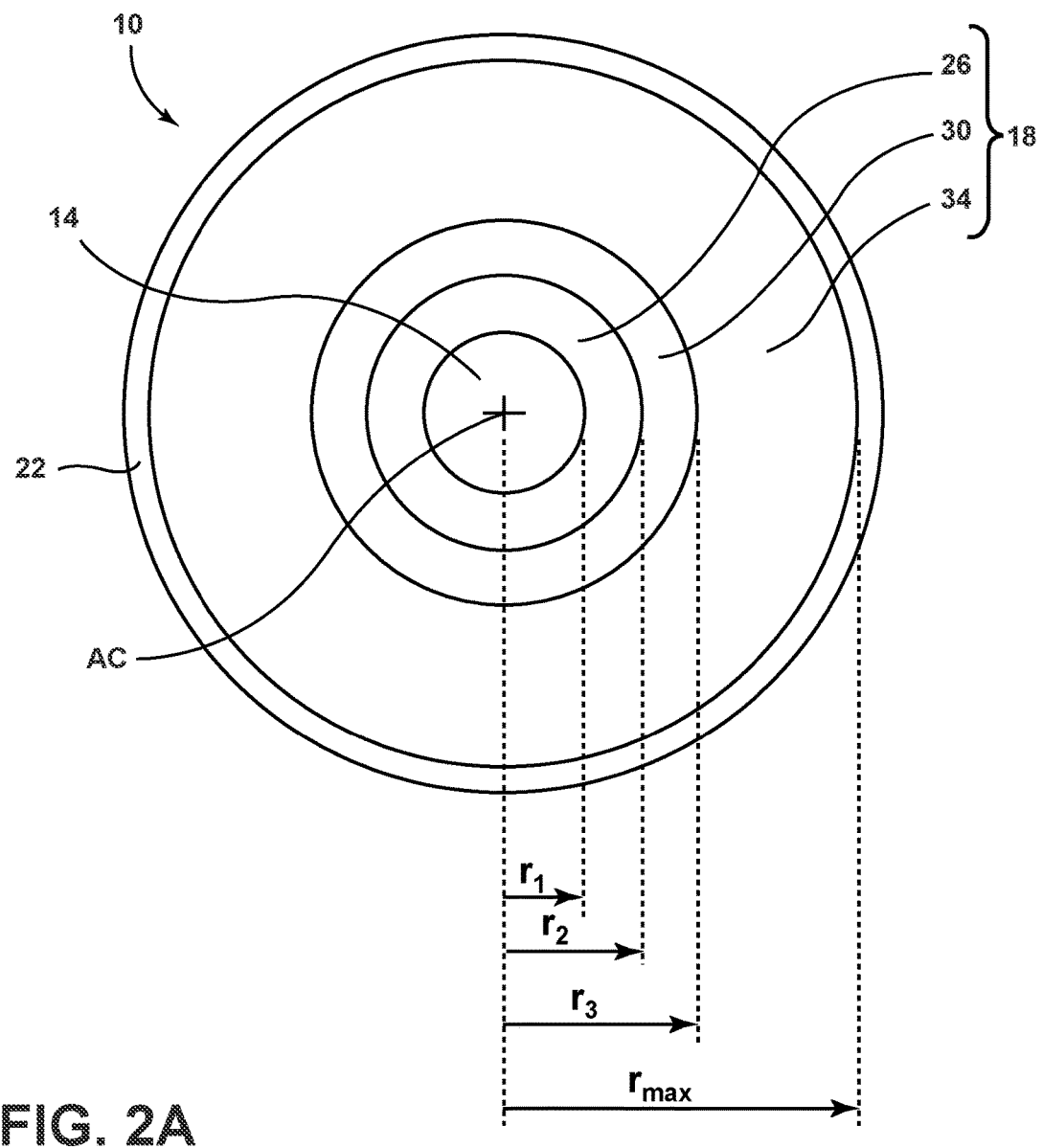
FIG. 2A is a cross-sectional view of the optical fiber taken through line IIA-IIA of FIG. 1 according to one embodiment of the present disclosure.

Referring now to FIG. 2A, a schematic cross-sectional diagram of the optical fiber 10 is shown according to some ring embodiments of the current disclosure. The single mode optical fiber 10 includes the germania doped silica central core 14 region having outer radius $r_1$ and 3.5 microns≤$r_1$≤5.5 microns and refractive index $\Delta_1$, a maximum refractive index $\Delta_{1max}$, and 0.32%≤$\Delta_{1max}$ 0.45%, and a core alpha profile, Core$_\alpha$ where 1≤Core$_\alpha$≤100. The optical fiber 10 also includes the cladding 18 region including (i) a first inner cladding region 26 surrounding the germania doped central core 14 and having an outer radius $r_2$ and 4.5 microns≤$r_2$≤7.5 microns and refractive index $\Delta_2$ and an $r_1/r_2$ ratio and 0.60≤$r_1/r_2$≤0.90; (ii) and a second inner cladding or a ring region 30 surrounding the first inner cladding 26 region and having an outer radius $r_3$ and 5.5 microns≤$r_3$≤20.5 microns and comprising refractive index $\Delta_3$ and a maximum refractive index $\Delta_{3max}$ and 0.02%≤$\Delta_{3max}$≤0.15%; and (iii) an outer cladding region 34 surrounding the second inner cladding or ring region 30 and having refractive index $\Delta_4$, wherein $\Delta_{1max}>\Delta_{3max}>\Delta_4\geq\Delta_2$. The optical fiber 10 exhibits a 22 m cable cutoff less than or equal to 1260 nm, a macrobending loss at 1550 nm of ≤0.75 dB/turn on a 20 mm diameter mandrel, a zero dispersion wavelength, $\lambda_0$, 1300 nm≤$\lambda_0$≤1324 nm, and a mode field diameter at 1310 nm of 8.2 microns≤MFD$_{1310\,nm}$≤9.6 microns.

Figure 2B:
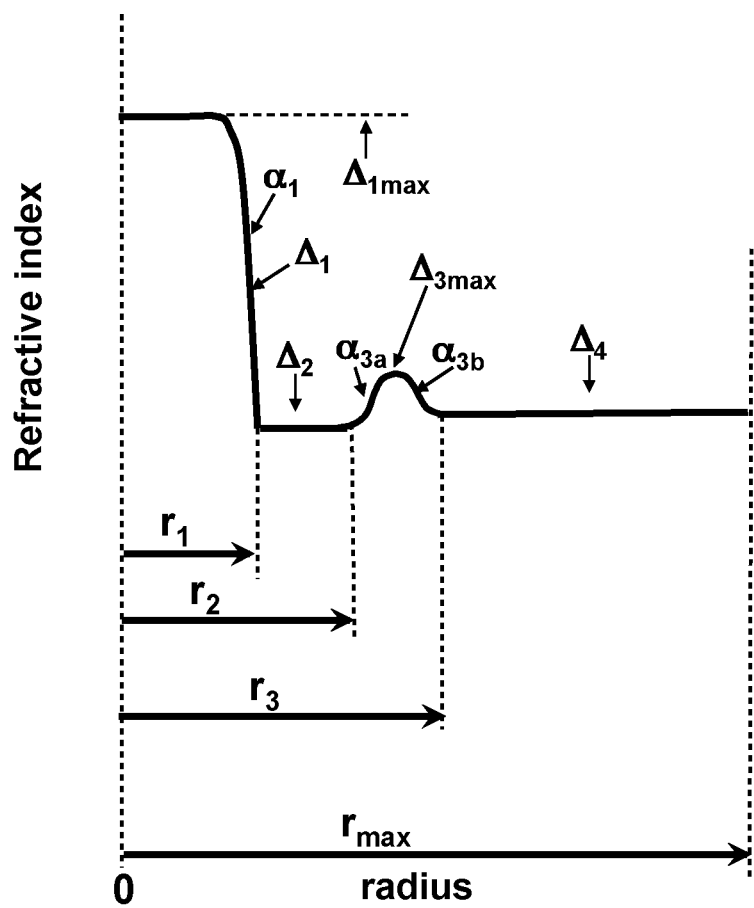
FIG. 2B is a plot of the relative refractive index profile Δ of the optical fiber of FIG. 2A.

Referring now to FIG. 2B, a plot of the relative refractive index profile ("index profile") $\Delta$ versus radius r for the optical fiber represented in FIG. 2A is shown.

The cladding 18 of the ring embodiments in the optical fiber 10 includes three regions that progress outwardly from the core 14 in the following order: the inner cladding region 26 having the radius $r_2$ and the refractive index $\Delta_2$; the ring region 30 surrounding the first inner cladding layer 26 extending to the radial distance $r_3$ and having the maximum refractive index $\Delta_{3max}$; and the outer cladding region 34 having a radius $r_{max}$ and having the refractive index $\Delta_4$. The respective refractive indexes of the core 14 and cladding 18 are $\Delta_{1max}>\Delta_{3max}>\Delta_4\geq\Delta_2$.

Adjacent cladding regions are coupled with one another while the inner cladding region 26 is in contact and coupled with the core 14. The outer cladding region 34 may be in contact and coupled with the undoped silica layer 22.

Table 1 below sets forth five examples (Ex. 1.1 through Ex. 1.5) of the Ring Embodiments used in the optical fiber 10.

TABLE 1

| Parameter | Ex. 1.1 | Ex. 1.2 | Ex. 1.3 | Ex. 1.4 | Ex. 1.5 |
|---|---|---|---|---|---|
| Core, $\Delta_{1max}$, % | 0.35 | 0.38 | 0.375 | 0.356 | 0.325 |
| $r_1$, microns | 4.3 | 4.55 | 4.5 | 4.38 | 4.65 |
| Core α, $\alpha_{core}$ | 20 | 20 | 20 | 20 | 20 |
| Core dopant | GeO$_2$ | GeO$_2$ | GeO$_2$ | GeO$_2$ | GeO$_2$ |
| $\Delta_2$, % | 0 | 0 | 0 | 0 | 0 |
| $r_2$, microns | 5.31 | 5.5 | 5.47 | 6.52 | 6.93 |
| $r_1/r_2$ | 0.81 | 0.83 | 0.82 | 0.67 | 0.67 |
| $\alpha_{3a}$ | 100 | 100 | 100 | 0.7 | 0.7 |
| $\alpha_{3b}$ | 100 | 100 | 100 | 3 | 3 |
| $\Delta_{3max}$, % | 0.1 | 0.1 | 0.1 | 0.025 | 0.03 |
| $r_3$, microns | 6.3 | 6.25 | 6.42 | 8.85 | 9.31 |
| Ring width, microns | 1.02 | 0.75 | 1 | 2.33 | 2.37 |
| Ring dopant | GeO$_2$ | GeO$_2$ | GeO$_2$ | GeO$_2$ | GeO$_2$ |
| $\Delta_4$, % | 0 | 0.03 | 0.03 | 0 | 0 |

TABLE 1-continued

| Parameter | Ex. 1.1 | Ex. 1.2 | Ex. 1.3 | Ex. 1.4 | Ex. 1.5 |
|---|---|---|---|---|---|
| $r_{max}$, % | 62.5 | 62.5 | 62.5 | 62.5 | 62.5 |
| Dispersion at 1310 nm (ps/nm/km) | −0.37 | −0.19 | −0.03 | −0.08 | 0.40 |
| Dispersion Slope at 1310 nm, (ps/nm²/km) | 0.087 | 0.087 | 0.087 | 0.086 | 0.087 |
| Dispersion at 1550 nm, (ps/nm/km) | 16.7 | 17.1 | 16.8 | 16.5 | 17.2 |
| Dispersion at Slope 1550 nm, (ps/nm²/km) | 0.059 | 0.059 | 0.059 | 0.058 | 0.059 |
| MFD at 1310 nm, microns | 9.19 | 9.20 | 9.20 | 9.00 | 9.48 |
| MFD at 1550 nm, microns | 10.5 | 10.4 | 10.4 | 10.2 | 10.8 |
| LLWM @ 1550 nm, dB/m | 0.56 | 0.43 | 0.52 | 0.42 | 0.80 |
| WMCD at 1550 nm, dB/km | 0.05 | 0.05 | 0.05 | 0.05 | 0.05 |
| Pin Array at 1550 nm, dB | 8.08 | 5.80 | 7.80 | 6.82 | 1.0 |
| Zero dispersion wavelength, $\lambda_0$, nm | 1314 | 1312 | 1310 | 1311 | 1305 |
| 22 m Cable Cutoff, $\lambda_C$, nm | 1200 | 1235 | 1205 | 1215 | 1220 |
| MACC # (MFD at 1310 nm/Cable Cutoff) | 7.66 | 7.45 | 7.63 | 7.40 | 7.77 |
| 1 × 20 mm 1550 nm macrobend loss, dB/turn | 0.37 | 0.33 | 0.36 | 0.29 | 0.39 |
| 1 × 30 mm 1550 nm macrobend loss, dB/turn | 0.005 | 0.0034 | 0.005 | 0.002 | 0.01 |
| Attn at 1550 nm, dB/km | ≤0.19 | ≤0.19 | ≤0.19 | ≤0.19 | ≤0.19 |
| Attn at 1310 nm, dB/km | ≤0.33 | ≤0.33 | ≤0.33 | ≤0.33 | ≤0.33 |

In some embodiments, the $\Delta_{1max}$ ranges from $0.34\% \leq \Delta_{1max} \leq 0.45\%$, $0.38\% \leq \Delta_{1max} \leq 0.43\%$, $0.32\% \leq \Delta_{1max} \leq 0.38\%$, or $0.32\% \leq \Delta_{1max} \leq 0.45\%$. In other embodiments, $\Delta_{1max}$ can be 0.33%, 0.34%, 0.35%, 0.36%, 0.37%, 0.38%, or 0.39%.

In some embodiments, the outer radius $r_2$ ranges from 4.5 microns ≤ $r_2$ ≤ 7.5 microns, 5.3 microns ≤ $r_2$ ≤ 7.0 microns, 6.4 microns ≤ $r_2$ ≤ 7.1 microns, or 5.2 microns ≤ $r_2$ ≤ 5.5 microns. In other embodiments, $r_2$ can be 5.3 microns, 5.4 microns, 5.5 microns, 5.6 microns, 6.4 microns, 6.5 microns, 6.6 microns, 6.7 microns, 6.8 microns, 6.9 microns, or 7.0 microns.

In some embodiments, the refractive index $\Delta_2$ ranges from $0\% \leq \Delta_2 \leq 1.0\%$. In other embodiments, the refractive index $\Delta_2$ ranges from $0\% \leq \Delta_2 \leq 0.5\%$. In still other embodiments, the refractive index $\Delta_2$ ranges from $0\% \leq \Delta_2 \leq 0.1\%$. In additional embodiments, a $r_1/r_2$ ratio is $0.60 \leq r_1/r_2 \leq 0.90$, $0.65 \leq r_1/r_2 \leq 0.85$, $0.65 \leq r_1/r_2 \leq 0.90$, or $0.70 \leq r_1/r_2 \leq 0.85$.

In some embodiments, the outer radius $r_3$ ranges from 5.5 microns ≤ $r_3$ ≤ 20.5 microns, 5.5 microns ≤ $r_3$ ≤ 15.0 microns, 5.5 microns ≤ $r_3$ ≤ 10.0 microns, 6.0 microns ≤ $r_3$ ≤ 12.5 microns, 6.0 microns ≤ $r_3$ ≤ 11.5 microns, or 6.0 microns ≤ $r_3$ ≤ 9.5 microns. In other embodiments, $r_3$ can be 6.0 microns, 6.5 microns, 7.0 microns, 7.5 microns, 8.0 microns, 8.5 microns, 9.0 microns, 9.5 microns, or 10.0 microns.

In some embodiments, the $\alpha_{3a}$ ranges from $0.1 \leq \alpha_{3a} \leq 100$ or in other embodiments $\alpha_{3a}$ can be 0.7 or 100. In some embodiments, the $\alpha_{3b}$ ranges from $0.1 \leq \alpha_{3b} \leq 100$ or in other embodiments $\alpha_{3b}$ can be 3 or 100.

In some embodiments, the $\Delta_{3max}$ ranges from $0.02\% \leq \Delta_{3max} \leq 0.15\%$, $0.05\% \leq \Delta_{3max} \leq 0.10\%$, or $0.07\% \leq \Delta_{3max} \leq 0.10\%$. In other embodiments, $\Delta_{3max}$ can be 0.02%, 0.03%, 0.05%, 0.07%, 08%, or 0.10%. Ring volumes, $V_{ring}$, are reported in absolute value % delta·microns² and can range from 0.4% delta·microns² ≤ $V_{ring}$ ≤ 15% delta·microns² or 0.8% delta·microns² ≤ $V_{ring}$ ≤ 5% delta·microns².

In some embodiments, the refractive index $\Delta_4$ ranges from $0\% \leq \Delta_4 \leq 1.0\%$, $0\% \leq \Delta_4 \leq 0.5\%$, or $0\% \leq \Delta_4 \leq 0.1\%$. In other embodiments, $\Delta_4$ can be 0.01%, 0.03%, 0.05%, 0.07%, or 0.09%.

In some embodiments, the optical fiber 10 may exhibit a wire mesh covered drum microbend loss, WMCD, at 1550 nm of >0 and ≤0.1 dB/km. In other embodiments the wire mesh covered drum microbend loss, WMCD, at 1550 nm of ≤0.05 dB/km.

In some embodiments, the optical fiber 10 has a macrobending loss at 1550 nm of ≤0.75 dB/turn on a 20 mm diameter mandrel. In other embodiments, the optical fiber 10 has a macrobending loss at 1550 nm of ≤0.5 dB/turn on a 20 mm diameter mandrel. In still other embodiments, the optical fiber 10 has a macrobending loss at 1550 nm of ≤0.05 dB/turn on a 30 mm diameter mandrel. In additional embodiments, the optical fiber 10 has a macrobending loss at 1550 nm of ≤0.005 dB/turn on a 30 mm diameter mandrel.

In some embodiments, the ring embodiments of the optical fiber 10 has an attenuation at 1550 nm of ≤0.19 dB/km. In additional embodiments, the attenuation at 1550 nm is ≤0.18 dB/km for the ring embodiments of the optical fiber 10.

In some embodiments, the ring embodiments of the optical fiber 10 has an attenuation at 1310 nm of ≤0.33 dB/km. In additional embodiments, the attenuation at 1310 nm is ≤0.32 dB/km for the ring embodiments of the optical fiber 10.

In some embodiments the optical fiber 10 has a zero dispersion wavelength, 4, and 1300 nm ≤ $\lambda_0$ ≤ 1324 nm.

In some embodiments the optical fiber 10 exhibits a 22 m cable cutoff less than or equal to 1260 nm.

In some embodiments, the optical fiber 10 exhibits a mode field diameter at 1310 nm ($MFD_{1310\ nm}$) of $8.2 \leq MFD_{1310\ nm} \leq 9.6$ microns. In other embodiments, the optical fiber 10 exhibits a mode field diameter at 1310 nm of 9.0 microns ≤ $MFD_{1310\ nm}$ ≤ 9.5 microns.

Pedestal Embodiments

Figure 3A:
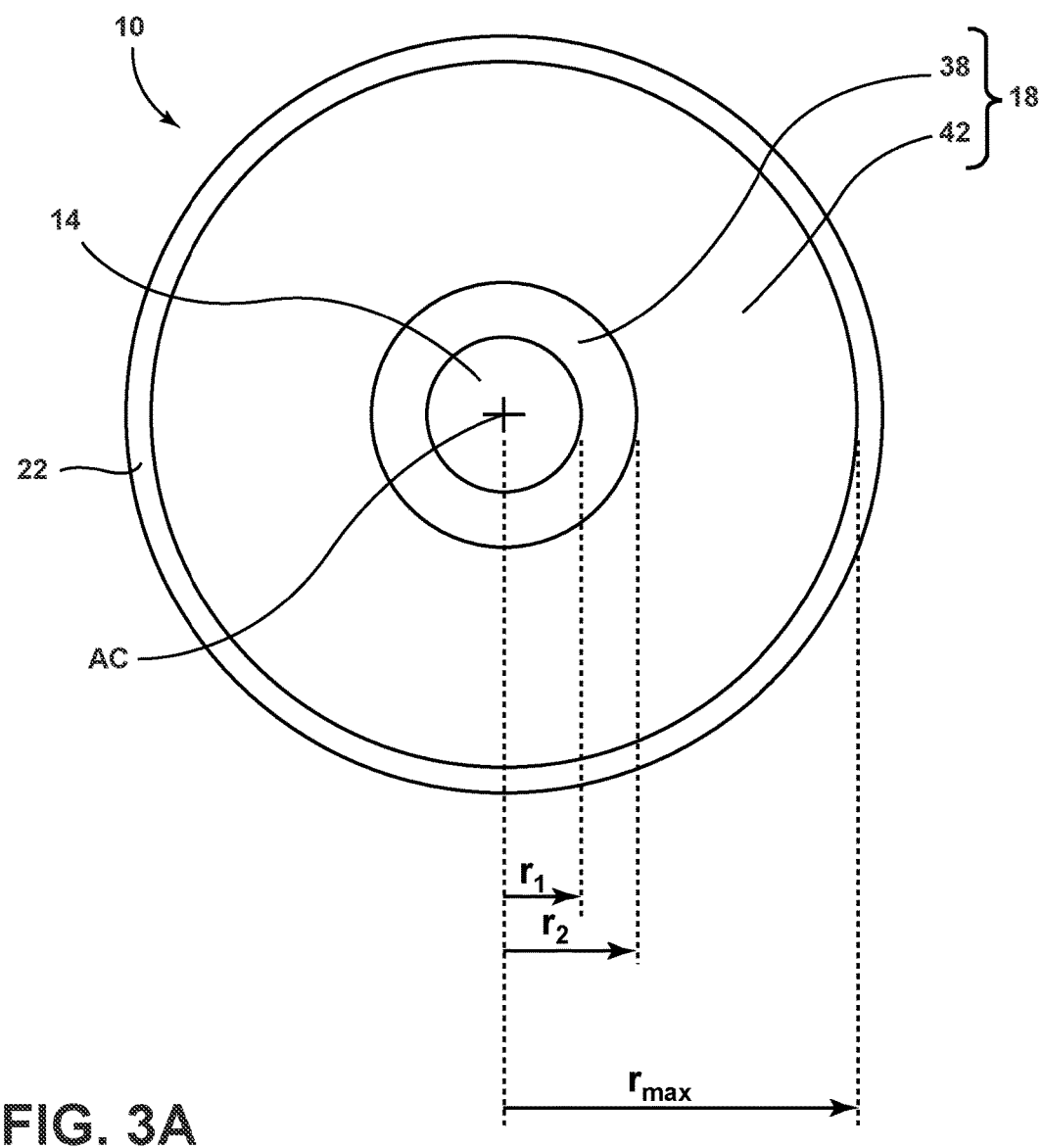
FIG. 3A is a cross-sectional view of an optical fiber taken through line IIIA-IIIA of FIG. 1 according to another embodiment of the present disclosure.

Referring now to FIG. 3A, a schematic cross-sectional diagram of the optical fiber 10 is shown according to some embodiments of the present disclosure. The single mode optical fiber 10 includes the germania doped silica central core 14 region having outer radius $r_1$ and 3.5 microns≤$r_1$≤5.5 microns and refractive index $\Delta_1$, a maximum refractive index $\Delta_{1max}$, and 0.32%≤$\Delta_{1max}$≤0.45%, and a core alpha profile, $Core_\alpha$ where 1≤$Core_\alpha$≤100. The optical fiber 10 also and having a refractive index $\Delta_4$. The respective refractive indexes of the core 14 and cladding 18 are $\Delta_{1max}$≥$\Delta_2$≥$\Delta_4$.

Adjacent cladding regions are coupled with one another while the pedestal layer 38 is in contact and coupled with the core 14. The outer cladding layer 42 is in contact and coupled with the undoped silica layer 22.

Table 2 below sets forth five examples (Ex. 2.1 through Ex. 2.5) of the Pedestal Embodiments used in the optical fiber 10.

TABLE 2

| Parameter | Ex. 2.1 | Ex. 2.2 | Ex. 2.3 | Ex. 2.4 | Ex. 2.5 |
|---|---|---|---|---|---|
| Core, $\Delta_{1max}$, % | 0.352 | 0.36 | 0.36 | 0.359 | 0.33 |
| $r_1$, microns | 3.97 | 3.71 | 3.98 | 4.1 | 4.1 |
| Core α, $\alpha_{core}$ | 20 | 100 | 20 | 20 | 20 |
| Core dopant | $GeO_2$ | $GeO_2$ | $GeO_2$ | $GeO_2$ | $GeO_2$ |
| $\Delta_2$, % | 0.05 | 0.1 | 0.07 | 0.035 | 0.06 |
| $r_2$, microns | 7.08 | 6.0 | 6.95 | 7.3 | 7.0 |
| $r_1/r_2$ | 0.56 | 0.62 | 0.57 | 0.56 | 0.59 |
| Pedestal dopant | $GeO_2$ | $GeO_2$ | $GeO_2$ | $GeO_2$ | $GeO_2$ |
| $\Delta_4$, % | 0 | 0 | 0 | 0 | 0 |
| $r_{max}$, % | 62.5 | 62.5 | 62.5 | 62.5 | 62.5 |
| Dispersion at 1310 nm (ps/nm/km) | −0.55 | −0.59 | −0.91 | −0.81 | −0.70 |
| Dispersion Slope at 1310 nm, (ps/nm²/km) | 0.087 | 0.088 | 0.088 | 0.087 | 0.088 |
| Dispersion at 1550 nm, (ps/nm/km) | 16.5 | 16.7 | 16.4 | 16.1 | 16.6 |
| Dispersion at Slope 1550 nm, (ps/nm²/km) | 0.060 | 0.060 | 0.061 | 0.059 | 0.061 |
| MFD at 1310 nm, microns | 9.19 | 9.20 | 9.20 | 9.01 | 9.51 |
| MFD at 1550 nm, microns | 10.5 | 10.5 | 10.6 | 10.3 | 10.9 |
| LLWM @ 1550 nm, dB/m | 0.57 | 0.53 | 0.58 | 0.52 | 1.15 |
| WMCD at 1550 nm, dB/km | 0.05 | 0.05 | 0.05 | 0.05 | 0.05 |
| Pin Array at 1550 nm, dB | 8.01 | 7.47 | 7.61 | 8.52 | 15.63 |
| Zero dispersion wavelength, $\lambda_0$, nm | 1316 | 1316 | 1320 | 1319 | 1318 |
| 22 m Cable Cutoff, $\lambda_C$, nm | 1200 | 1205 | 1205 | 1220 | 1215 |
| MACC # (MFD at 1310 nm/Cable Cutoff) | 7.66 | 7.63 | 7.64 | 7.38 | 7.83 |
| 1 × 20 mm 1550 nm macrobend loss, dB/turn | 0.41 | 0.331 | 0.38 | 0.19 | 0.40 |
| 1 × 30 mm 1550 nm macrobend loss, dB/turn | 0.005 | 0.004 | 0.005 | 0.0015 | 0.004 |
| Attn at 1550 nm, dB/km | ≤0.19 | ≤0.19 | ≤0.19 | ≤0.19 | ≤0.19 |
| Attn at 1310 nm, dB/km | ≤0.33 | ≤0.33 | ≤0.33 | ≤0.33 | ≤0.33 | includes the cladding region 18 including (i) an inner cladding or a pedestal region 38 surrounding the germania doped silica central core 14 region and having an outer radius $r_2$ and 5.5 microns≤$r_2$≤20.5 microns and refractive index $\Delta_2$ and a $r_1/r_2$ ratio and 0.25≤$r_1/r_2$≤0.85; and (ii) an outer cladding region 42 surrounding the inner cladding region 38 and having refractive index $\Delta_4$, wherein $\Delta_{1max}$>$\Delta_2$>$\Delta_4$, and 0.02%≤$\Delta_2$−$\Delta_4$≤0.15%. The optical fiber 10 exhibits a 22 m cable cutoff less than or equal to 1260 nm, a macrobending loss at 1550 nm of ≤0.7 dB/turn on a 20 mm diameter mandrel, has a zero dispersion wavelength, $\lambda_0$, and 1300 nm≤$\lambda_0$≤1324 nm, and a mode field diameter at 1310 nm of 8.2 microns≤$MFD_{1310\ nm}$≤9.6 microns.

Figure 3B:
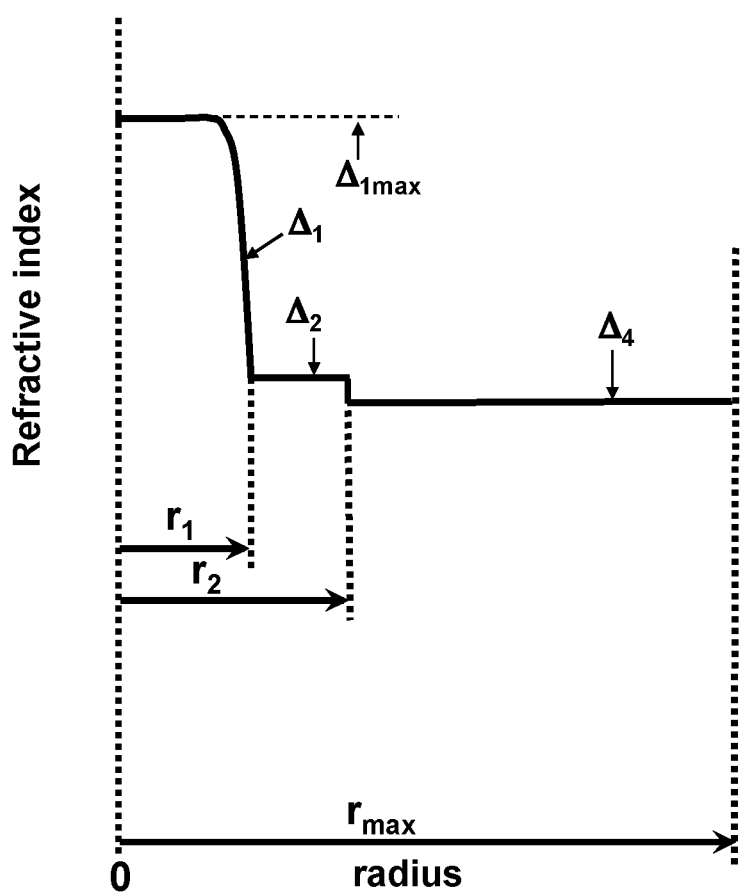
FIG. 3B is a plot of the relative refractive index profile Δ of the optical fiber of FIG. 3A.

Referring now to FIG. 3B, a plot of the relative refractive index profile ("index profile") Δ versus radius r for the optical fiber represented in FIG. 3A.

The cladding 18 of the pedestal embodiments of optical fiber 10 includes two regions that progress outwardly from the core 14 in the following order: a pedestal layer 38 surrounding the core 14 having a radius $r_2$ and a refractive index $\Delta_2$; and an outer cladding layer 42 having a radius $r_{ma}$, In some embodiments, the $\Delta_{1max}$ ranges from 0.34%≤$\Delta_{1max}$≤0.45%, 0.38%≤$\Delta_{1max}$≤0.43%, 0.32%≤$\Delta_{1max}$≤0.38%, or 0.32%≤$\Delta_{1max}$≤0.45%. In other embodiments, $\Delta_{1max}$ can be 0.33%, 0.34%, 0.35%, 0.36%, 0.37%, 0.38%, or 0.39%.

In some embodiments, the outer radius $r_2$ ranges from 4.5 microns≤$r_2$≤20.5 microns, 4.5 microns≤$r_2$≤7.5 microns, 5.3 microns≤$r_2$≤17.5 microns, 5.3 microns≤$r_2$≤7.0 microns, 5.5 microns≤$r_2$≤20.5 microns, 5.5 microns≤$r_2$≤7.5 microns, 6.0 microns≤$r_2$≤17.5 microns, or 6.0 microns≤$r_2$≤7.3 microns. In other embodiments, $r_2$ can be 6.0 microns, 6.3 microns, 6.5 microns, 6.8 microns, 7.0 microns, 7.3 microns, 10.0 microns, 15.0 microns, 17.5 microns, or 20.5 microns.

In some embodiments, a $r_1/r_2$ ratio is 0.25≤$r_1/r_2$≤0.85, 0.25≤$r_1/r_2$≤0.65, 0.3≤$r_1/r_2$≤0.85, or 0.40≤$r_1/r_2$≤0.75.

In some embodiments, the refractive index $\Delta_2$ ranges from 0%≤$\Delta_2$≤1.0% or 0%≤$\Delta_2$≤0.5%, 0%≤$\Delta_2$≤0.1%. In other embodiments, $\Delta_2$ can be 0.01%, 0.03%, 0.05%, 0.07%, or 0.09%. Pedestal volumes are reported in absolute value in units of % delta·microns². In some embodiments, the pedestal volumes are 1% delta·microns²≤$V_{pedestal}$≤15% delta·microns² or 2% delta·microns²≤$V_{pedestal}$≤6% delta·microns².

In some embodiments, the optical fiber 10 has a macrobending loss at 1550 nm of ≤0.75 dB/turn on a 20 mm diameter mandrel. In other embodiments, the optical fiber 10 has a macrobending loss at 1550 nm of 0.5 dB/turn on a 20 mm diameter mandrel. In still other embodiments, the optical fiber 10 has a macrobending loss at 1550 nm of ≤0.05 dB/turn on a 30 mm diameter mandrel. In additional embodiments, the optical fiber 10 has a macrobending loss at 1550 nm of ≤0.005 dB/turn on a 30 mm diameter mandrel.

In some embodiments, the optical fiber 10 may exhibit the wire mesh covered drum microbend loss, WMCD, at 1550 nm is ≤0.1 dB/km, In other embodiments, the wire mesh covered drum microbend loss, WMCD, at 1550 nm is ≤0.05 dB/km.

In some embodiments, the attenuation at 1550 nm is ≤0.19 dB/km for the pedestal embodiments. In other embodiments, the attenuation at 1550 nm is ≤0.18 dB/km for the pedestal embodiments.

In some embodiments, the attenuation at 1310 nm is ≤0.33 dB/km for the pedestal embodiments. In other embodiments, the attenuation at 1310 nm is ≤0.32 dB/km for the pedestal embodiments.

In some embodiments the optical fiber 10 has a zero dispersion wavelength, 4, and 1300 nm≤$\lambda_0$≤1324 nm.

In some embodiments, the optical fiber 10 exhibits a mode field diameter at 1310 nm (MFD$_{1310\ nm}$) of 8.2≤MFD$_{1310\ nm}$≤9.6 microns. In other embodiments, the optical fiber 10 exhibits a mode field diameter at 1310 nm of 9.0 microns≤MFD$_{1310\ nm}$≤9.5 microns.

The core and cladding of the present coated fibers may be produced in a single-step operation or multi-step operation by methods which are well known in the art. Suitable methods include: the double crucible method, rod-in-tube procedures, and doped deposited silica processes, also commonly referred to as chemical vapor deposition ("CVD") or vapor phase oxidation. A variety of CVD processes are known and are suitable for producing the core and cladding layer used in the coated optical fibers of the present invention. They include external CVD processes, axial vapor deposition processes, modified CVD (MCVD), inside vapor deposition, and plasma-enhanced CVD (PECVD).

The glass portion of the coated fibers may be drawn from a specially prepared, cylindrical preform which has been locally and symmetrically heated to a temperature sufficient to soften the glass, e.g., a temperature of about 2000° C. for a silica glass. As the preform is heated, such as by feeding the preform into and through a furnace, a glass fiber is drawn from the molten material. See, for example, U.S. Pat. Nos. 7,565,820; 5,410,567; 7,832,675; and 6,027,062; the disclosures of which are hereby incorporated by reference herein, for further details about fiber making processes.

The optical fibers 10 described in the ring and pedestal embodiments herein may include one or more coatings positioned between the germania doped silica central core 14 region and the one or more layers of cladding 18. In some embodiments, there is a primary coating in contact with the outer radius of the germania doped silica central core 14 region and a secondary coating in contact with the outer radius of the primary coating.

The primary coating may be formed from a curable composition that includes an oligomer and a monomer. The oligomer may be a urethane acrylate or a urethane acrylate with acrylate substitutions. The urethane acrylate with acrylate substitutions may be a urethane methacrylate. The oligomer may include urethane groups. The oligomer may be a urethane acrylate that includes one or more urethane groups. The oligomer may be a urethane acrylate with acrylate substitutions that includes one or more urethane groups. Urethane groups may be formed as a reaction product of an isocyanate group and an alcohol group.

The primary coating may have an in situ modulus of elasticity of 1 MPa or less, 0.50 MPa or less, 0.25 MPa or less, 0.20 MPa or less, 0.19 MPa or less, 0.18 MPa or less, 0.17 MPa or less, 0.16 MPa or less, or 0.15 MPa or less. The glass transition temperature of the primary coating may be −15° C. or less, or −25° C. or less, or −30° C. or less, or −40° C. or less.

The secondary coating may be formed from a curable secondary composition that includes one or more monomers. The one or more monomers may include bisphenol-A diacrylate, or a substituted bisphenol-A diacrylate, or an alkoxylated bisphenol-A diacrylate. The alkoxylated bisphenol-A diacrylate may be an ethoxylated bisphenol-A diacrylate. The curable secondary composition may further include an oligomer. The oligomer may be a urethane acrylate or a urethane acrylate with acrylate substitutions. The secondary composition may be free of urethane groups, urethane acrylate compounds, urethane oligomers or urethane acrylate oligomers.

The secondary coating may be a material with a higher modulus of elasticity and higher glass transition temperature than the primary coating. The in situ modulus of elasticity of the secondary coating may be 1200 MPa or greater, 1500 MPa or greater, 1800 MPa or greater, 2100 MPa or greater, 2400 MPa or greater, or 2700 MPa or greater. The secondary coating may have an in situ modulus between about 1500 MPa and 10,000 MPa, or between 1500 MPa and 5000 MPa. The in situ glass transition temperature of the secondary coating may be at least 50° C., at least 55° C., at least 60° C. or between 55° C. and 65° C.

The radius of the coated fibers coincides with the outer diameter of the secondary coating. The radius of the coated fiber may be 125 μm or less, 110 μm or less, 105 μm or less, or 100 μm or less. In some embodiments, the coated optical fiber diameter is 150 microns≤coated optical fiber diameter≤210 microns. Within the coated fiber, the glass radius (coinciding with the outer diameter of the cladding) may be at least 50 μm, at least 55 μm, at least 60 μm, or at least 62.5 μm. The germania doped silica central core 14 region may be surrounded by the primary coating. The outer radius of the primary coating may be 85 μm or less, 82.5 μm or less, 80 μm or less, 77.5 μm or less, or 75 μm or less. The balance of the coated fiber diameter is provided by the secondary coating.

It will be apparent to those skilled in the art that various modifications and variations can be made without departing from the spirit or scope of the claims.

What is claimed is:

1. A single mode optical fiber comprising:
   a germania doped silica central core region having outer radius $r_1$ and 3.5 microns≤$r_1$≤5.5 microns and refractive index $\Delta_1$, a maximum refractive index $\Delta_{1max}$, and 0.32%≤$\Delta_{1max}$≤0.45%, and a core alpha profile, Core$_\alpha$ where 1≤Core$_\alpha$≤100; and
   a cladding region comprising (i) a first inner cladding region surrounding the germania doped silica central core region having an outer radius $r_2$ and 4.5 microns≤$r_2$≤7.5 microns and refractive index $\Delta_2$ and an $r_1/r_2$ ratio and 0.60≤$r_1/r_2$≤0.90; (ii) and a second inner cladding region surrounding the first inner cladding region having an outer radius $r_3$ and 5.5 microns≤$r_3$≤20.5 microns, comprising refractive index $\Delta_3$, and a maximum refractive index $\Delta_{3max}$ and 0.02%≤$\Delta_{3max}$≤0.15%; and (iii) an outer cladding region surrounding the second inner cladding region and comprising refractive index $\Delta_4$, wherein $\Delta_{1max} > \Delta_{3max} > \Delta_4 \leq \Delta_2$;

wherein the single mode optical fiber exhibits a 22 m cable cutoff less than or equal to 1260 nm, a macrobending loss at 1550 nm of ≤0.75 dB/turn on a 20 mm diameter mandrel, has a zero dispersion wavelength, $\lambda_0$, of 1300 nm ≤ $\lambda_0$ ≤ 1324 nm, a mode field diameter at 1310 nm of 9.0 microns ≤ $MFD_{1310\,nm}$ < 9.5 microns, and a MACC number between 7.1 and 7.5.

2. The single mode optical fiber of claim 1, wherein the macrobending loss at 1550 nm is ≤0.5 dB/turn on a 20 mm diameter mandrel.

3. The single mode optical fiber of claim 1, wherein the macrobending loss at 1550 nm is ≤0.05 dB/turn on a 30 mm diameter mandrel.

4. The single mode optical fiber of claim 1, wherein the macrobending loss at 1550 nm is ≤0.005 dB/turn on a 30 mm diameter mandrel.

5. The single mode optical fiber of claim 1, wherein the maximum refractive index $\Delta_{1max}$ is 0.32% ≤ $\Delta_{1max}$ ≤ 0.39%.

6. The single mode optical fiber of claim 1, wherein the $Core_\alpha$ ≥ 10.

7. The single mode optical fiber of claim 1, wherein the maximum refractive index $\Delta_{3max}$ is 0.05% ≤ $\Delta_{3max}$ ≤ 0.10%.

8. The single mode optical fiber of claim 1, wherein the $r_1/r_2$ ratio is 0.65 ≤ $r_1/r_2$ ≤ 0.85.

9. The single mode optical fiber of claim 1, wherein the outer radius $r_3$ is 6.0 microns ≤ $r_3$ ≤ 12.5 microns.

10. The single mode optical fiber of claim 1, wherein the macrobending loss exhibited by the optical fiber at 1550 nm is ≤0.70 dB/turn on a 20 mm diameter mandrel.

11. A single mode optical fiber comprising:
a germania doped silica central core having outer radius $r_1$ and 3.5 microns ≤ $r_1$ ≤ 5.5 microns and refractive index $\Delta_1$, a maximum refractive index $\Delta_{1max}$, and 0.32% ≤ $\Delta_{1max}$ ≤ 0.45%, and a core alpha profile, $Core_\alpha$, where 1 ≤ $Core_\alpha$ ≤ 100; and
a cladding region comprising (i) an inner cladding region surrounding the germania doped silica central core region having an outer radius $r_2$ and 5.5 microns ≤ $r_2$ ≤ 20.5 microns and refractive index $\Delta_2$ and a $r_1/r_2$ ratio and 0.25 ≤ $r_1/r_2$ ≤ 0.85; and (ii) an outer cladding region surrounding the inner cladding region and comprising refractive index $\Delta_4$, wherein $\Delta_{1max} > \Delta_2 > \Delta_4$, and 0.02% ≤ $\Delta_2 - \Delta_4$ ≤ 0.15%;

wherein the single mode optical fiber exhibits a 22 m cable cutoff less than or equal to 1260 nm, a macrobending loss at 1550 nm of ≤0.75 dB/turn on a 20 mm diameter mandrel, has a zero dispersion wavelength, $\lambda_0$, of 1300 nm ≤ $\lambda_0$ ≤ 1324 nm, and a mode field diameter at 1310 nm of 9.0 microns ≤ $MFD_{1310\,nm}$ < 9.5 microns.

12. The single mode optical fiber of claim 11, wherein the macrobending loss at 1550 nm is ≤0.5 dB/turn on a 20 mm diameter mandrel.

13. The single mode optical fiber of claim 11, wherein the macrobending loss at 1550 nm is ≤0.05 dB/turn on a 30 mm diameter mandrel.

14. The single mode optical fiber of claim 11, wherein the macrobending loss at 1550 nm of 0.005 dB/turn on a 30 mm diameter mandrel.

15. The single mode optical fiber of claim 11, wherein the maximum refractive index $\Delta_{1max}$ is 0.32% ≤ $\Delta_{1max}$ ≤ 0.40%.

16. The single mode optical fiber of claim 11, wherein $Core_\alpha$ ≥ 10.

17. The single mode optical fiber of claim 11, wherein the $r_1/r_2$ ratio is 0.25 ≤ $r_1/r_2$ ≤ 0.65.

18. The single mode optical fiber of claim 11, wherein the outer radius $r_2$ is 6 microns ≤ $r_2$ ≤ 17.5 microns.

19. The single mode optical fiber of claim 11, wherein the macrobending loss exhibited by the optical fiber at 1550 nm is ≤0.70 dB/turn on a 20 mm diameter mandrel and exhibits a MACC number between 7.1 and 7.5.

20. The single mode optical fiber of claim 11, wherein the optical fiber has a wire mesh covered drum microbend loss, (WMCD) at 1550 nm of ≤0.1 dB/km.

* * * * *

UNITED STATES PATENT AND TRADEMARK OFFICE
CERTIFICATE OF CORRECTION

PATENT NO. : 10,302,857 B2
APPLICATION NO. : 15/957414
DATED : May 28, 2019
INVENTOR(S) : Dana Craig Bookbinder et al.

Page 1 of 1

It is certified that error appears in the above-identified patent and that said Letters Patent is hereby corrected as shown below:

In the Claims

In Column 15, Line 3, Claim 1, delete "$\leq$" and insert -- $\geq$ --, therefor.

In Column 16, Line 22, Claim 14, delete "of 0.005" and insert -- of $\leq 0.005$ --, therefor.

Signed and Sealed this
Twenty-sixth Day of November, 2019

Andrei Iancu
*Director of the United States Patent and Trademark Office*